United States Patent
Cho et al.

(10) Patent No.: US 10,700,321 B2
(45) Date of Patent: Jun. 30, 2020

(54) ELECTRODE LEAD AND SECONDARY BATTERY HAVING SAME

(71) Applicant: LG CHEM, LTD., Seoul (KR)

(72) Inventors: Seung-Su Cho, Daejeon (KR); Dong-Hyun Kim, Daejeon (KR); Jin-Young Kim, Daejeon (KR); Gi-Su Jeong, Daejeon (KR); Won-Seok Jeong, Daejeon (KR); Seung-Don Choi, Daejeon (KR); Won-Pill Hwang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 85 days.

(21) Appl. No.: 15/557,029

(22) PCT Filed: Jun. 8, 2016

(86) PCT No.: PCT/KR2016/006070
§ 371 (c)(1),
(2) Date: Sep. 8, 2017

(87) PCT Pub. No.: WO2016/200147
PCT Pub. Date: Dec. 15, 2016

(65) Prior Publication Data
US 2018/0062131 A1 Mar. 1, 2018

(30) Foreign Application Priority Data

Jun. 8, 2015 (KR) .................. 10-2015-0080740
Jun. 7, 2016 (KR) .................. 10-2016-0070306

(51) Int. Cl.
*H01M 2/12* (2006.01)
*H01M 2/34* (2006.01)
(Continued)

(52) U.S. Cl.
CPC ............ *H01M 2/12* (2013.01); *H01M 2/021* (2013.01); *H01M 2/0212* (2013.01); *H01M 2/06* (2013.01);
(Continued)

(58) Field of Classification Search
None
See application file for complete search history.

(56) References Cited

U.S. PATENT DOCUMENTS

| 2003/0049527 A1 | 3/2003 | Yageta et al. |
| 2007/0026302 A1 | 2/2007 | Yoon |

(Continued)

FOREIGN PATENT DOCUMENTS

| CN | 103081161 A | 5/2013 | |
| EP | 2429018 A1 * | 3/2012 | .............. H01M 2/22 |

(Continued)

OTHER PUBLICATIONS

JP2000-067846, Machine Translation, Morisako, Aug. 2000 (Year: 2000).*

(Continued)

*Primary Examiner* — Devina Pillay
(74) *Attorney, Agent, or Firm* — Birch, Stewart, Kolasch & Birch, LLP

(57) ABSTRACT

The present disclosure provides an electrode lead that ensures safety of a secondary battery when gas is generated within the secondary battery. The electrode lead is included in a pouch-type secondary battery in which outer circumferential parts of a pouch casing are sealed and an electrode assembly is accommodated in a center part of the pouch casing. The electrode lead includes an inner lead at least partially formed of an electrically-conductive material, contacting an electrode tab of the electrode assembly, and interposed between the sealing parts of the pouch casing;

(Continued)

and an outer lead disposed outside of the inner lead, at least partially formed of an electrically-conductive material, providing an external terminal connectable to an external device, interposed between the sealing parts of the pouch casing, and configured such that a portion of the outer lead contacts the inner lead and that, when an inner pressure of the pouch-type secondary battery increases, the outer lead is partially deformed and thus the portion of the outer lead is detached from the inner lead.

20 Claims, 8 Drawing Sheets

(51) Int. Cl.
    *H01M 2/02* (2006.01)
    *H01M 2/06* (2006.01)
    *H01M 2/10* (2006.01)
    *H01M 2/24* (2006.01)
    *H01M 2/26* (2006.01)
    *H01M 10/052* (2010.01)

(52) U.S. Cl.
    CPC .............. *H01M 2/10* (2013.01); *H01M 2/24* (2013.01); *H01M 2/26* (2013.01); *H01M 2/345* (2013.01); *H01M 10/052* (2013.01); *H01M 2200/20* (2013.01)

(56) References Cited

U.S. PATENT DOCUMENTS

| | | | |
|---|---|---|---|
| 2012/0015240 A1* | 1/2012 | Baek | H01M 2/021 429/178 |
| 2012/0040235 A1 | 2/2012 | Cho et al. | |
| 2015/0072185 A1* | 3/2015 | Cho | H01M 2/30 429/56 |

FOREIGN PATENT DOCUMENTS

| | | | | |
|---|---|---|---|---|
| JP | 2000-67846 A | | 3/2000 | |
| JP | 2000067846 A | * | 3/2000 | ............ H01M 2/34 |
| KE | 2011-71132 A | | 4/2011 | |
| KR | 10-2007-0013568 A | | 1/2007 | |
| KR | 10-2011-0034489 A | | 4/2011 | |
| KR | 10-2014-0049748 A | | 4/2014 | |
| WO | WO-2014062016 A1 | * | 4/2014 | ............ H01M 2/30 |

OTHER PUBLICATIONS

International Search Report for PCT/KR2016/006070 (PCT/ISA/210) dated Sep. 27, 2016.

* cited by examiner

ELECTRODE LEAD AND SECONDARY BATTERY HAVING SAME

TECHNICAL FIELD

The present application claims priority to Korean Patent Application No. 10-2015-0080740 filed on Jun. 8, 2015 and Korean Patent Application No. 10-2016-0070306 filed on Jun. 7, 2016 in the Republic of Korea, the disclosures of which are incorporated herein by reference.

The present disclosure relates to battery technology, and more particularly, to an electrode lead having an improved structure to enhance safety when an inner pressure of a secondary battery increases, a secondary battery including the electrode lead, and a battery pack including the electrode lead.

BACKGROUND ART

Currently commercial secondary batteries include a nickel cadmium battery, a nickel hydrogen battery, a nickel zinc battery, a lithium secondary battery, etc. Among them, lithium secondary batteries are attaining much attention because they are freely charged or discharged due to rare occurrence of a memory effect and have a very low self-discharge rate and a high energy density, compared with nickel-based secondary batteries.

Such lithium secondary batteries generally use a lithium-based oxide and a carbon material as a positive electrode active material and a negative electrode active material, respectively. Lithium secondary batteries include an electrode assembly, and an outer casing, namely, a battery case, that seals and accommodates the electrode assembly together with an electrolyte. The electrode assembly includes a positive electrode plate and a negative electrode plate respectively coated with such a positive electrode active material and such a negative electrode active material, and a separator interposed between the positive and negative electrode plates.

In general, lithium secondary batteries may be classified into can-type secondary batteries including an electrode assembly built in a metal can, and pouch-type secondary batteries having an electrode assembly built in a pouch of an aluminum laminate sheet.

Recently, secondary batteries are being widely used in not only small devices, such as portable electronic devices, but also medium and large sized devices, such as cars or power storage devices. In such battery packs, a large number of secondary batteries may be electrically connected to each other in order to increase the capacity and the output. Pouch-type secondary batteries are being more widely used due to advantages, such as easy stacking and a light weight.

Pouch-type secondary batteries may be generally manufactured by injecting an electrolyte into a pouch casing having an electrode assembly accommodated therein and sealing the pouch casing.

FIG. 1 is an exploded perspective view of a pouch-type secondary battery according to the related art, and FIG. 2 is an assembled perspective view of the pouch-type secondary battery of FIG. 1.

As shown in FIGS. 1 and 2, the pouch-type secondary battery may include an electrode assembly 20 and a pouch casing 30 that accommodates the electrode assembly 20.

The electrode assembly 20 basically includes a positive electrode plate, a negative electrode plate, and a separator between the positive and negative electrode plates, and may be accommodated in an inner space I formed in the pouch casing 30. The pouch casing 30 may include an upper pouch 31 and a lower pouch 32. Sealing parts S may be provided on respective outer circumferential surfaces of the upper pouch 31 and the lower pouch 32, respectively, and may be attached to each other to seal the inner space I in which the electrode assembly 20 is accommodated.

At least one positive electrode tab 21 and at least one negative electrode tab 22 may extend from the positive electrode plate and the negative electrode plate, respectively. The positive electrode tab 21 and the negative electrode tab 22 may be coupled with a plate-shaped electrode lead 10. In other words, the positive electrode tab 21 and the negative electrode tab 22 may be coupled with a plate-shaped positive electrode lead 11 and a plate-shaped negative electrode lead 12, respectively. The positive electrode lead 11 and the negative electrode lead 12 are partially exposed to the outside of the pouch casing 30, thereby providing an electrode terminal that can be electrically connected to an external structure of the secondary battery, for example, another secondary battery or an external device.

One of the most important issues for such a secondary battery is ensuring safety. If safety of a secondary battery is not properly ensured, this may lead to not only damage of the secondary battery but also accidents, such as an electric shock, a fire, and an explosion, thereby causing life damage and property damage.

In particular, secondary batteries may generate gas therein for various reasons, such as overcharge, overdischarge, and a short circuit. For example, in the case of lithium secondary batteries, an electrolyte may be dissolved during overcharge, and a large amount of gas may be generated. As such, when gas is generated in a secondary battery, an inner pressure of the secondary battery increases, and thus the secondary battery may swell. The swelling may not only cause damage of the secondary battery but also lead to explosion or fire-catching of the secondary battery. In particular, when a secondary battery explodes or catches fire, a device including the secondary battery may be damaged, and accordingly a user using the device may be injured. Moreover, when an electrolyte inside the secondary battery leaks due to damage of the outer casing of the secondary battery, a problem, such as a short circuit or an electric shock, may occur. In addition, hybrid cars, electric cars, and power storage devices, which are driven by batteries, have greatly large outputs and capacities, and thus damage thereof due to such internal generation of gas may become serious.

DISCLOSURE

Technical Problem

The present disclosure is designed to solve the problems of the related art, and therefore the present disclosure is directed to providing an electrode lead that ensures safety of a secondary battery when a gas is generated in the secondary battery, and a secondary battery, a battery pack, and a vehicle including the electrode lead.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided an electrode lead of a pouch-type secondary battery in which outer circumferential parts of a pouch casing are sealed and an electrode assembly is accommodated in a center part of the pouch casing, the electrode lead including an inner lead at least partially formed of an electrically-conductive material, contacting an electrode tab of the electrode assembly, and interposed between the sealing parts of the pouch casing; and an outer lead disposed outside of the inner lead, at least partially formed of an electrically-conductive material, providing an external terminal connectable to an external device, interposed between the sealing parts of the pouch casing, and configured such that a portion of the outer lead contacts the inner lead and that, when an inner pressure of the pouch-type secondary battery increases, the outer lead is partially deformed and thus the portion of the outer lead is detached from the inner lead.

The inner lead may include a tab contact part formed of an electrically-conductive material and configured to contact the electrode tab of the electrode assembly, an inner contact part formed of an electrically-conductive material, having a plate shape, located outside the tab contact part and electrically connected to the tab contact part, and an inner edge part located along an edge of the inner contact part and interposed between the sealing parts of the pouch casing.

Furthermore, the outer lead may include an outer contact part formed of an electrically-conductive material, having a plate shape, at least partially contacting the inner contact part, and configured to be separable from the inner contact part when the inner pressure of the pouch-type secondary battery increases, a terminal part electrically connected to the outer contact part and exposed to an outside of the pouch casing such that the external device is connected to the terminal part, and an outer edge part located along an edge of the outer contact part and disposed in the sealing parts of the pouch casing to fixedly contact the sealing parts.

Furthermore, the outer contact part may be at least partially bent in an inward direction to partially contact the inner contact part.

Furthermore, an inner end of the bent portion of the outer contact part may be flat.

Furthermore, the inner contact part may have a coupling hole that penetrates through the inner contact part in an inside-outside direction, and the outer contact part may contact the inner contact part along an outer circumference of the coupling hole.

Furthermore, when the inner pressure of the pouch-type secondary battery increases, positions of the terminal part and the outer edge part may be fixed, and the outer contact part may move to an outward direction and may be detached from the inner contact part.

Furthermore, the outer lead may further include an outer cover part located on an outer end of the outer edge part to cover an outside of the outer contact part and disposed a predetermined distance apart from the outer contact part to form an empty space between the outer cover part and the outer contact part.

Furthermore, the outer cover part may have an outer through hole that penetrates through the outer cover part in the inside-outside direction.

Furthermore, the inner edge part and the outer edge part may be in an oval ring shape.

Furthermore, the inner contact part may have an inner through hole formed in an outside of a portion of the inner contact part that contacts the outer contact part, wherein the inner through hole penetrates through the inner contact part in the inside-outside direction.

Furthermore, the outer contact part may have at least one notch formed in an outside of a portion of the outer contact part that contacts the inner contact part.

Furthermore, the electrode lead may further include an insulating member formed of an electrically-insulating material, having a ring shape, and interposed between an edge of the inner lead and an edge of the outer lead to electrically insulate the edge of the inner lead from the edge of the outer lead.

Furthermore, respective portions of the inner lead and the outer lead that contact each other may be welded.

Furthermore, the electrode lead may further include a sealing film interposed between the inner lead and the outer lead and the sealing parts of the pouch casing to attach the inner lead and the outer lead to the sealing parts of the pouch casing.

In another aspect of the present disclosure, there is also provided a pouch-type secondary battery including the electrode lead according to the present disclosure.

In another aspect of the present disclosure, there is also provided a battery pack including the pouch-type secondary battery according to the present disclosure.

In another aspect of the present disclosure, there is also provided a vehicle including the battery pack according to the present disclosure.

Advantageous Effects

The present disclosure gives the following effects.

According to an aspect of the present disclosure, when a gas is generated within a secondary battery and thus an inner pressure of the secondary battery increases, an electrical connection between an inner lead and an outer lead may be blocked. Accordingly, additional gas generation may be prevented, and an electric shock of a user, explosion of the secondary battery, a fire, and the like may be prevented. In addition, flow of current to an external device connected to the secondary battery may be blocked to prevent damage of the external device.

In particular, according to an embodiment of the present disclosure, even when the electrical connection between the inner lead and the outer lead is blocked, both the inner lead and the outer lead may keep their positions at a sealing part of a pouch casing and may not deviate from the sealing part of the pouch casing. Thus, damage of other components of a battery pack or an internal short circuit due to deviation of the outer lead from the sealing part of the pouch casing may be prevented.

Moreover, according to an aspect of the present disclosure, the gas generated within the secondary battery may be discharged. Thus, damage, explosion, fire-catching, or the like due to the increase in the inner pressure of the secondary battery may be prevented.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
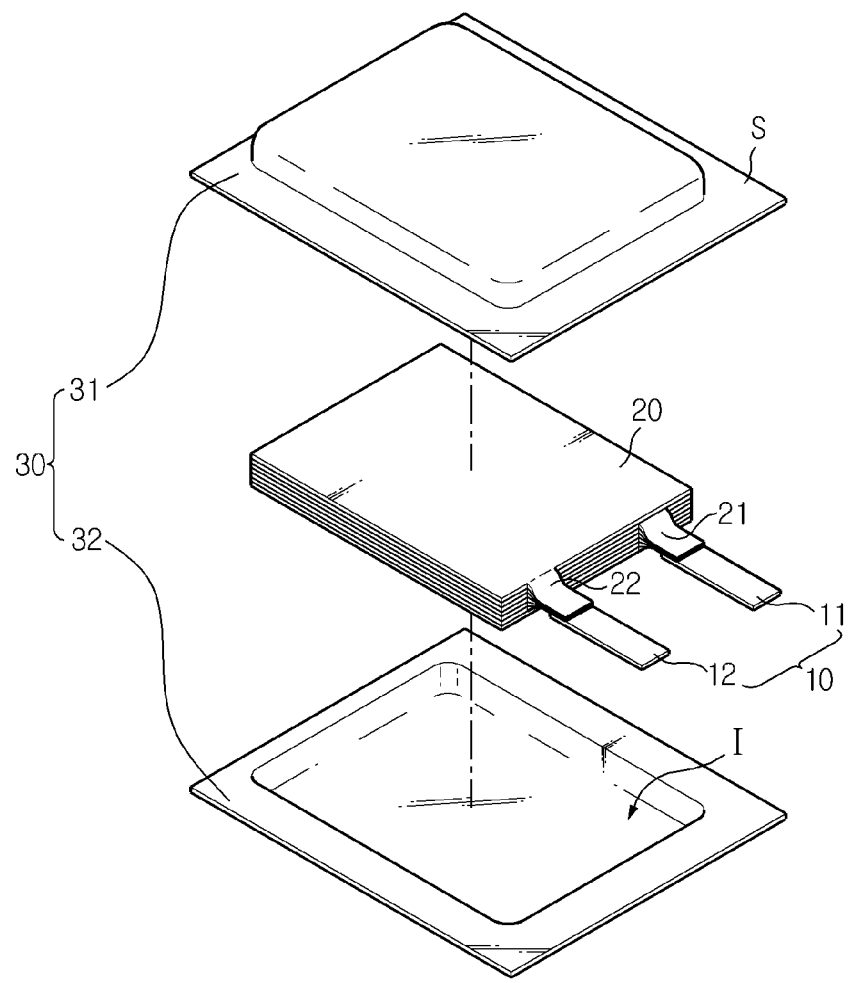
FIG. 1 is an exploded perspective view of a pouch-type secondary battery according to the related art.
Figure 2:
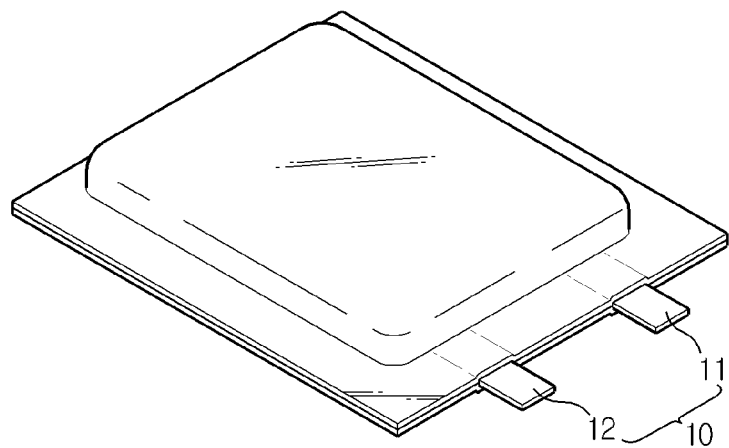
FIG. 2 is an assembled perspective view of the pouch-type secondary battery of FIG. 1.
Figure 3:
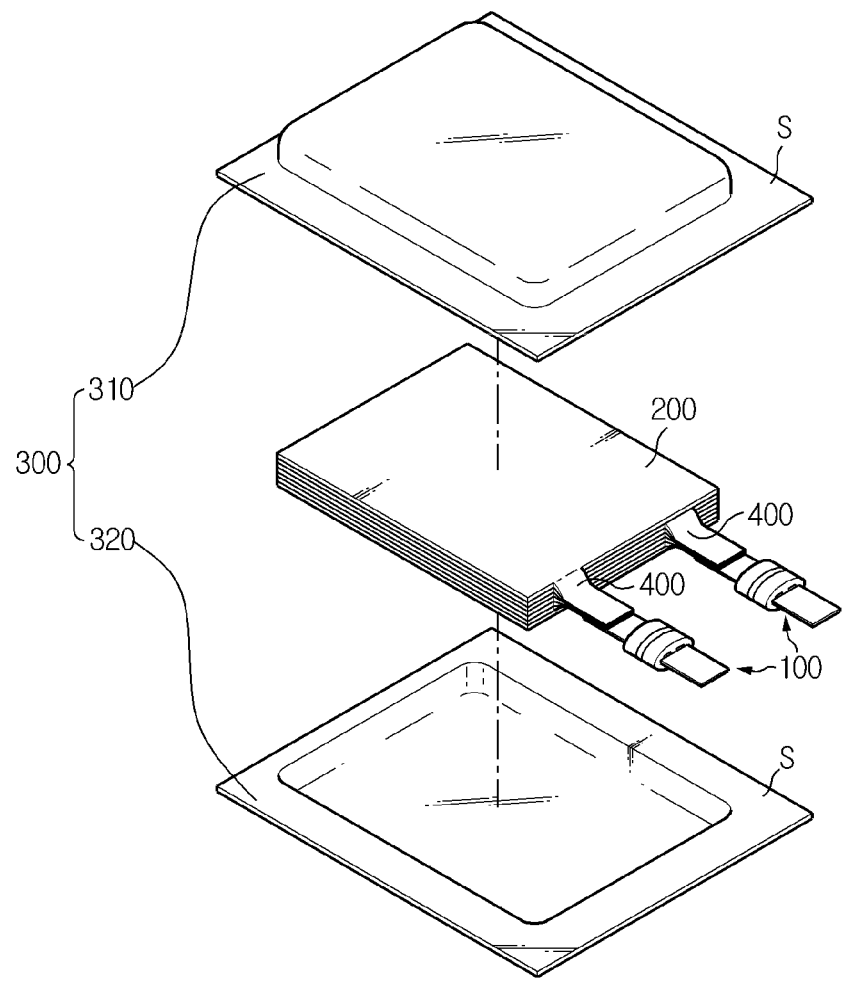
FIG. 3 is an exploded perspective view of a secondary battery according to an embodiment of the present disclosure.
Figure 4:
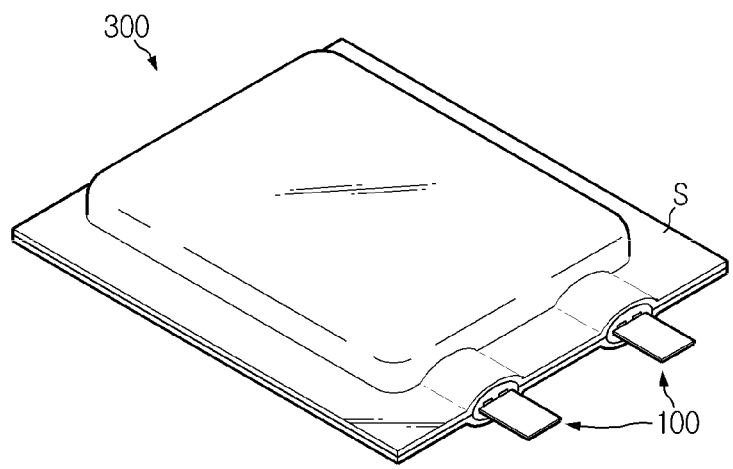
FIG. 4 is an assembled perspective view of the secondary battery of FIG. 3.

FIG. 3 is a schematic exploded perspective view of a secondary battery according to an embodiment of the present disclosure. FIG. 4 is an assembled perspective view of the secondary battery of FIG. 3.

Referring to FIGS. 3 and 4, the secondary battery according to the present disclosure may include an electrode assembly 200, a pouch casing 300, an electrode tab 400, and an electrode lead 100.

The electrode assembly 200 may include at least one positive electrode plate, at least one negative electrode plate, and a separator interposed between the at least one positive electrode plate and the at least one negative electrode plate. The electrode assembly 200 may be formed by alternately stacking a plurality of positive electrode plates and a plurality of negative electrode plates and then may be accommodated in the pouch casing 300. Alternatively, the electrode assembly 200 may be formed by winding a single positive electrode plate and a single negative electrode plate and then may be accommodated in the pouch casing 300.

The electrode plates of the electrode assembly 200 are formed by coating a current collector with active material slurry. Slurry may be typically formed by agitating a granular active material, an auxiliary conductor, a binder, and a platicizer to which a solvent has been added. Each of the electrode plates may include a plain part not coated with slurry, and an electrode tab 400 corresponding to each of the electrode plates may be formed on the plain part.

In the pouch casing 300, a concave inner space may be formed, and the electrode assembly 200 and an electrolyte may be accommodated in the inner space. In particular, the pouch casing 300 may include an external insulation layer formed of polymer, an internal adhesion layer formed of polymer, and a metal layer interposed between the external insulation layer and the internal adhesion layer. The metal layer of the pouch casing 300 may be formed of, but is not limited to, aluminum.

The pouch casing 300 may include an upper pouch 310 and a lower pouch 320. The inner space capable of accommodating the electrode assembly 200 may be formed in both respective center parts of the upper pouch 310 and the lower pouch 320, as shown in FIGS. 3 and 4, or may be formed in the center part of only one of the upper pouch 310 and the lower pouch 320. When the electrode assembly 200 is accommodated in the inner space of the upper pouch 310 or the lower pouch 320, a sealing part S formed on an outer circumferential part of the upper pouch 310 and a sealing part S formed on an outer circumferential part of the lower pouch 320 face each other, and internal adhesion layers of the upper pouch 310 and the lower pouch 320 are attached to each other by heat fusion or the like, such that the inner space is enclosed.

The electrode tab 400 may be formed of an electrically-conductive material, such as metal, and may extend from the electrode assembly 200 by protruding from the electrode assembly 200. The electrode tab 400 may include a positive electrode tab and a negative electrode tab. The positive electrode tab may extend from a plain part of the positive electrode plate, and the negative electrode tab may extend from a plain part of the negative electrode plate. The electrode tab 400 may be formed in a plate shape. The electrode tab 400 may have a cut electrode plate shape or a shape in which a separate metal plate is attached to an electrode plate.

A single positive electrode tab and a single negative electrode plate may be included in the secondary battery, but at least two positive electrode tabs and at least two negative electrode tabs may be included therein. For example, when the electrode assembly 200 of the secondary battery includes a single positive electrode plate and a single negative electrode plate, a single positive electrode tab and a single negative electrode tab may be included. Alternatively, a plurality of positive electrode tabs and a plurality of negative electrode tabs may be included even when the electrode assembly 200 of the secondary battery includes a single positive electrode plate and a single negative electrode plate. On the other hand, when the electrode assembly 200 of the secondary battery includes a plurality of positive electrode plates and a plurality of negative electrode plates, a plurality of positive electrode tabs and a plurality of negative electrode tabs may be included. In this case, each electrode plate may include the electrode tab 400.

The electrode lead 100 electrically connects the secondary battery to another external secondary battery or another device. For example, within a battery module, a plurality of secondary batteries may be electrically connected to each other via a bus bar. In this case, the electrode lead 100 may directly contact the bus bar. As such, because the electrode lead 100 performs electrical connection between the inside and outside of the secondary battery, at least a portion of the electrode lead 100 may be formed of an electrically-conductive material, such as metal.

The electrode lead 100 may include a positive electrode lead and a negative electrode lead, each of which may extend from the inside of the pouch casing 300 to the outside of the pouch casing 300 and may be interposed between the sealing parts of the pouch casing 300. One end, namely, an inner end, of the electrode lead 100 may be positioned within the pouch casing 300, and thus may be connected to the electrode tab 400 extending from the electrode assembly 200.

The connection between the electrode tab 400 and the electrode lead 100 may be achieved via direct contact therebetween. To stably maintain this contact, contacting portions between the electrode tab 400 and the electrode lead 100 may be fixed via welding. The secondary battery may include a plurality of positive electrode tabs and a plurality of negative electrode tabs. In this case, the plurality of positive electrode tabs may overlap with each other and contact a single positive electrode lead, and the plurality of negative electrode tabs may overlap with each other and contact a single negative electrode lead.

The other end of the electrode lead 100 may be exposed to the outside of the pouch casing 300. Accordingly, the one end of the electrode lead 100, which is the inner end thereof, may be positioned within the pouch casing 300 and may be connected to the electrode tab 400, and the other end of the electrode lead 100, which is an outer end thereof, may be positioned outside the pouch casing 300 and may be connected to the bus bar or the like.

Figure 5:
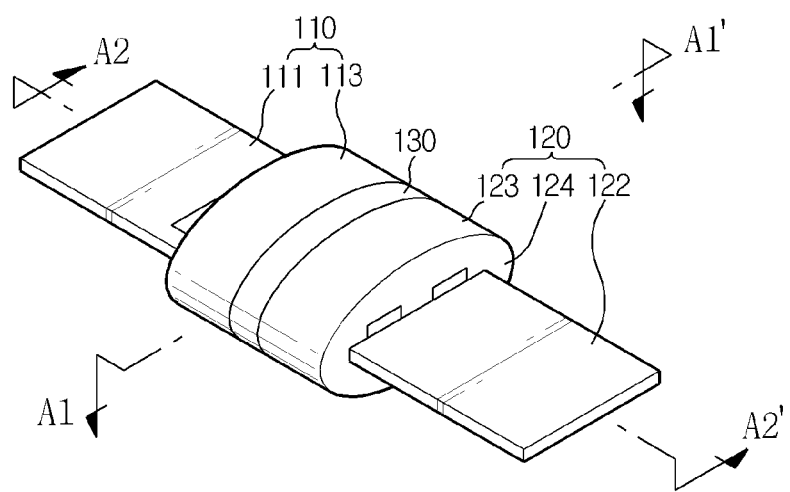
FIG. 5 is a magnified perspective view of an electrode lead according to an embodiment of the present disclosure.
Figure 6:
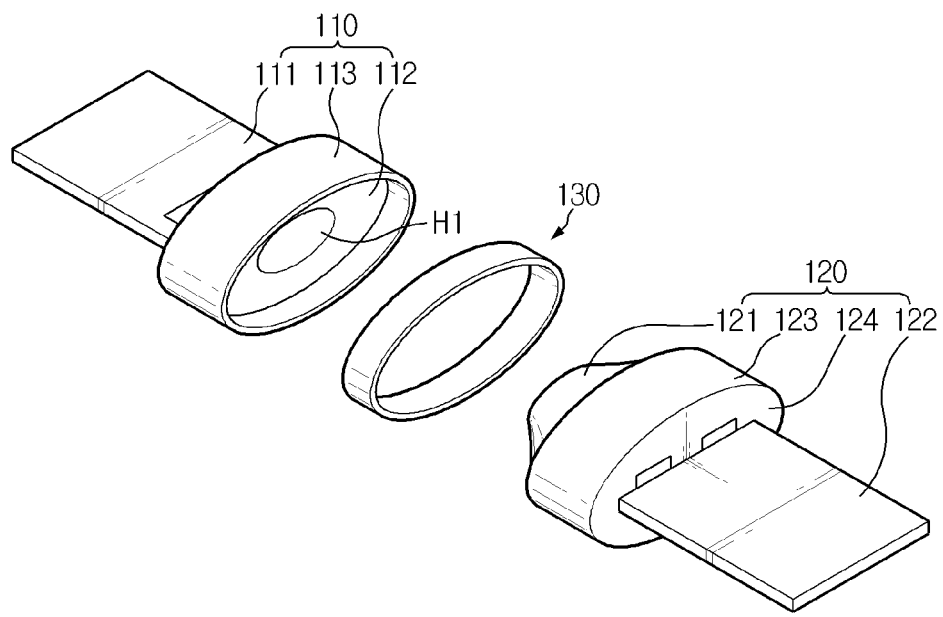
FIG. 6 is an exploded perspective view of the electrode lead of FIG. 5.
Figure 7:
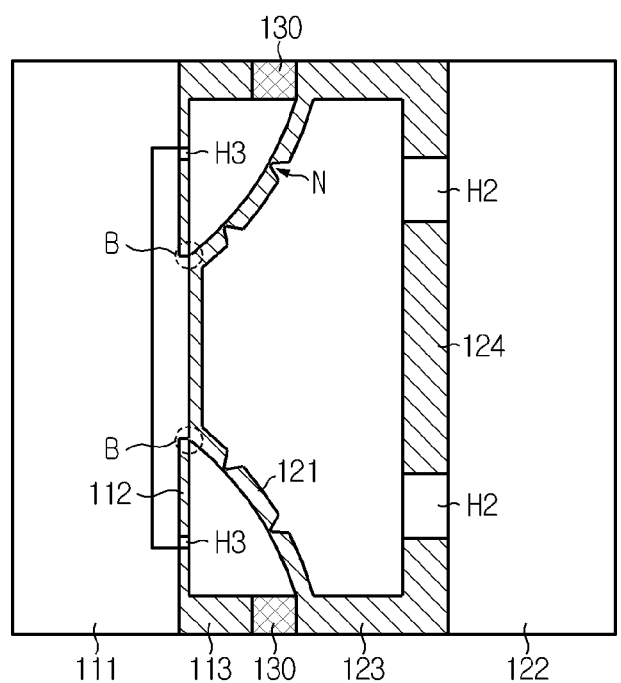
FIG. 7 is a top cross-sectional view taken along line A1-A1' of FIG. 5.
Figure 8:
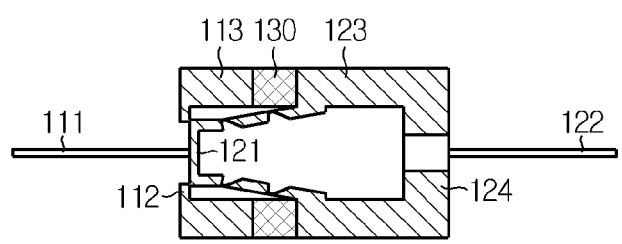
FIG. 8 is a front cross-sectional view taken along line A2-A2' of FIG. 5.
Figure 9:
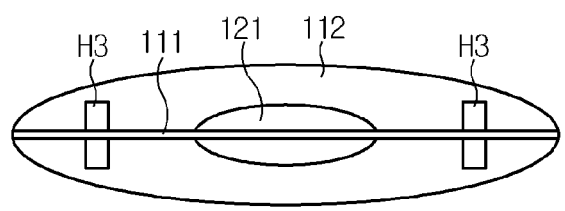
FIG. 9 is a left side view of FIG. 5.
Figure 10:
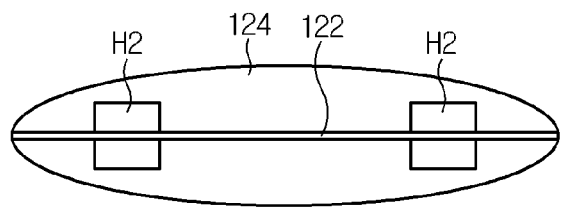
FIG. 10 is a right side view of FIG. 5.

FIG. 5 is a schematic magnified perspective view of a configuration of the electrode lead 100 according to an embodiment of the present disclosure, and FIG. 6 is an exploded perspective view of the electrode lead 100 of FIG. 5. FIG. 7 is a top cross-sectional view taken along line A1-A1' of FIG. 5, and FIG. 8 is a front cross-sectional view taken along line A2-A2' of FIG. 5. FIG. 9 is a left side view of FIG. 5, and FIG. 10 is a right side view of FIG. 5.

Referring to FIGS. 5-10, the electrode lead 100 of the secondary battery according to the present disclosure includes an inner lead 110 and an outer lead 120.

At least a portion of the inner lead 110 may be formed of an electrically-conductive material. For example, the inner lead 110 may be entirely formed of the same metal material, for example, copper or aluminum. When the inner lead 110 is entirely formed of the same metal material as described above, the inner lead 110 may be more easily manufactured.

The inner lead 110 is positioned on an inner side of the electrode lead 100 such that at least a portion of the inner lead 110 contacts the electrode tab 400 included in the electrode assembly 200. For example, in the structure of FIG. 3, a left end of the inner lead 110 may directly contact a plurality of electrode tabs 400.

At least a portion of the inner lead 110 may be interposed between the sealing parts of the pouch casing 300. For example, in the structure of FIGS. 3 and 4, while a right end of the inner lead 110 is interposed between the sealing part of the upper pouch 310 and the sealing part of the lower pouch 320, the sealing parts of the upper pouch 310 and the lower pouch 320 are sealed together, and thus the inner lead 110 may be interposed between the sealing parts of the pouch casing 300.

Unless mentioned otherwise, an inward direction refers to a direction toward the inside of the secondary battery, that is, a direction toward the electrode assembly 200, and an outward direction refers to a direction toward the outside of the secondary battery.

Preferably, the inner lead 110 may include a tab contact part 111, an inner contact part 112, and an inner edge part 113.

The tab contact part 111 directly contacts the electrode tab 400 of the electrode assembly 200, and thus may be formed of an electrically-conductive material to transmit or receive a current to and from the electrode tab 400. In addition, the tab contact part 111 may have a shape that facilitates the contact with the electrode tab 400. For example, the tab contact part 111 may have a plate shape as shown in FIGS. 5 and 6 such that at least one electrode tab 400 may be easily seated on a flat surface of the tab contact part 111. The electrode tab 400 seated on the tab contact part 111 may contact the tab contact part 111 and be fixed to thereto, by welding or the like.

The inner contact part 112 may be located outside of the tab contact part 111 and may be electrically connected to the tab contact part 111. The inner contact part 112 may be at least partially formed of an electrically-conductive material, such as metal, to transmit or receive current between the tab contact part 111 and the outer lead 120.

The inner contact part 112 may have a plate shape. For example, the inner contact part 112 may have an oval plate shape as shown in FIG. 6. At this time, the inner contact part 112 may be perpendicular to the ground as shown in FIG. 8. In particular, the tab contact part 111 may be in the shape of a plate parallel to the ground, and thus a plane of the inner contact part 112 may be perpendicular to that of the tab contact part 111.

The inner edge part 113 may have a ring shape and thus may be located along an edge of the inner contact part 112. For example, when the inner contact part 112 has an oval plate shape, the inner edge part 113 may have a shape of an oval ring that is located along an edge of the oval plate, that is, along an outer circumference of the oval plate.

The inner edge part 113 may be interposed between the sealing parts of the pouch casing 300. In particular, an outer circumferential surface of the inner edge part 113 is formed to have a flat curved surface, and thus the sealing parts of the pouch casing 300, namely, a lower surface of the sealing part of the upper pouch 310 and an upper surface of the sealing part of the lower pouch 320, may be attached to the entire area of the outer circumferential surface.

All of the several components of the inner lead 110, namely, the tab contact part 111, the inner contact part 112, and the inner edge part 113, may be formed of the same material. In this case, the tab contact part 111, the inner contact part 112, and the inner edge part 113 may be able to be integrated with one another, facilitating the manufacturing of the inner lead 110. In this case, the electrical connection between the tab contact part 111 and the inner contact part 112 may be stably maintained.

The outer lead 120 may be disposed outside of the inner lead 110. Similar to the inner lead 110, the outer lead 120 may be at least partially formed of an electrically-conductive material. For example, the outer lead 120 may be entirely formed of the same metal material, for example, copper or aluminum. When the outer lead 120 is entirely formed of the same metal material, the outer lead 120 may be more easily manufactured.

At least a portion of the outer lead 120 may provide an external terminal connectable to an external device. For example, in the structure of FIGS. 3 and 4, an external device, such as a bus bar, may be connected to a right end of the outer lead 120.

At least a portion of the outer lead 120 may be interposed between the sealing parts of the pouch casing 300. In other words, a portion of the outer lead 120 together with the inner lead 110 may be interposed between the sealing parts of the pouch casing 300.

The outer lead 120 may partially contact the inner lead 110. For example, in the structure of FIGS. 6 and 7, a left end of the outer lead 120 may contact the inner lead 110. When gas or the like is generated within the pouch-type secondary battery and thus an inner pressure of the pouch-type secondary battery increases, the contact portion of outer lead 120 and the inner lead 110 may be detached from each other.

In particular, a portion of the outer lead 120 is deformed when the inner pressure of the secondary battery increases, and thus the contact state between the outer lead 120 and the inner lead 110 may be released. In other words, the outer lead 120 is configured such that, when the inner pressure of the secondary battery increases, only a portion of the outer lead 120, for example, only the inside thereof, is deformed while the entire shape thereof, for example, the exterior thereof, is maintained, and thus the electric connection between the outer lead 120 and the inner lead 110 may be released.

Preferably, the outer lead 120 may include an outer contact part 121, a terminal part 122, and an outer edge part 123.

The outer contact part 121 may at least partially contact the inner lead 110, in particular, the inner contact part 112 of the inner lead 110, and thus may transmit or receive a current to or from the inner lead 110. Accordingly, the outer contact part 121 may be formed of an electrically-conductive material, such as metal.

The outer contact part 121 may have a plate shape. For example, the outer contact part 121 may have a shape of an oval metal plate. When the outer contact part 121 is formed in a plate shape as described above, the outer contact part 121 may smoothly contact the inner contact part 112, and thus an electrical connection between the outer contact part 121 and the inner contact part 112 may be more stably maintained.

In particular, the outer contact part 121 may be configured to be separable from the inner contact part 112 when the inner pressure of the pouch-type secondary battery increases. In other words, the outer contact part 121 contacts the inner contact part 112 in a normal state to thereby transmit or receive electrical energy to or from the inner contact part 112, and thus the electrode lead 100 may ordinarily function. However, in an abnormal state where the inner pressure of the secondary battery increases due to generation of gas within the secondary battery, the outer contact part 121 may be separated from the inner contact part 112 so that the contact therebetween may be released. Due to the contact release, the electrical connection between the inner contact part 112 and the outer contact part 121 is no longer maintained, and the electrode lead 100 may not ordinarily operate.

According to this configuration of the present disclosure, when gas is generated within the secondary battery due to overcharge or abnormal use, electrical connection between the inner lead 110 and the outer lead 120 is blocked, and thus the secondary battery is no longer charged or discharged. Accordingly, because the function of the secondary battery is stopped in such an abnormal situation, additional generation of gas, leakage of an electrolyte, explosion, fire-catching, a short circuit, or the like may be prevented. Thus, according to this aspect of the present disclosure, the secondary battery may have more improved safety.

The terminal part 122 may be formed of an electrically-conductive material to be electrically connected to the outer contact part 121. The terminal part 122 may be exposed to the outside of the pouch casing 300 and thus may serve as a terminal of the secondary battery. In other words, the terminal part 122 may provide an area to which an external component of the pouch-type secondary battery is to be electrically connected. For example, the terminal part 122 may directly contact a bus bar connected to a terminal part 122 of another secondary battery.

The terminal part 122 may have a plate shape as shown in FIGS. 3-6 such that an external component, such as the bus bar, may easily contact the terminal part 122. For example, similar to the tab contact part 111, the terminal part 122 may have a shape of a horizontally-flat metal plate.

The outer edge part 123 may have a ring shape and thus may be located along an edge of the outer contact part 121. For example, when the outer contact part 121 has an oval plate shape, the outer edge part 123 may have a shape of an oval ring that is arranged along an outer circumference of the oval plate.

The outer edge part 123 may be interposed between the sealing parts of the pouch casing 300 and may contact the sealing parts and be fixed thereto. In particular, the outer edge part 123 may have an outer circumference surface in the shape of a flat curved surface, and thus the sealing parts of the pouch casing 300 may be attached to the entire area of the outer circumferential surface.

The outer edge part 123 may contact both the upper pouch 310 and the lower pouch 320 and be fixed thereto. In other words, an upper portion of the outer edge part 123 may contact the lower surface of the sealing part of the upper pouch 310 and be fixed thereto, and a lower portion of the outer edge part 123 may contact the upper surface of the sealing part of the lower pouch 320 and be fixed thereto.

In particular, the contacting and fixing between the outer edge part 123 and the upper and lower pouches 310 and 320 may be maintained even when the electrical connection between the inner lead 110 and the outer lead 120 is blocked due to generation of gas within the secondary battery. In other words, when gas is generated within the secondary battery, the inner contact part 112 is physically separated from the outer contact part 121, and thus the electrical connection between the inner lead 110 and the outer lead 120 may be blocked, but still the outer edge part 123 may be adhered and fixed between the upper pouch 310 and the lower pouch 320.

The maintenance of the contacting and fixing between the outer edge part 123 and the upper and lower pouches 310 and 320 when gas is generated within the secondary battery is also applicable to the inner edge part 113. In other words, when connection between the inner lead 110 and the outer lead 120 is blocked due to generation of gas within the secondary battery, the contacting and fixing between the inner edge part 113 and the upper and lower pouches 310 and 320 may be maintained.

According to this structure of the present disclosure, when the inner pressure of the secondary battery increases, the electrical connection between the outer lead 120 and the inner lead 110 may be blocked, but the locations of the outer lead 120 and the inner lead 110 may be fixed. Therefore, a problem, such as damage or an electrical short circuit of another component outside the secondary battery due to deviation of the inner lead 110 or the outer lead 120, may be prevented.

The outer edge part 123 may have a similar shape to that of the inner edge part 113. For example, the outer edge part 123 and the inner edge part 113 may have oval ring shapes having the same long radius and the same short radius.

In particular, according to this embodiment in which the outer edge part 123 and the inner edge part 113 have oval ring shapes, the outer lead 120 and the inner lead 110 may be more smoothly sealed with the pouch casing 300. In other words, the outer edge part 123 and the inner edge part 113 may be respective portions of the outer lead 120 and the inner lead 110 that contact the pouch casing 300 and are surrounded by the pouch casing 300. When the outer edge part 123 and the inner edge part 113 have oval shapes, the pouch casing 300 may be more closely attached to the outer edge part 123 and the inner edge part 113. Thus, in this case, a problem, such as leakage of an electrolyte or permeation of external moisture or a foreign material due to generation of a gap between the electrode lead 100 and the pouch casing 300, may be prevented.

The several components of the outer lead 120, namely, the outer contact part 121, the terminal part 122, and the outer edge part 123, may be formed of the same type of material. In this case, the outer contact part 121, the terminal part 122, and the outer edge part 123 may be able to be integrated with one another, thereby facilitating the manufacturing of the outer lead 120. In this case, the electrical connection between the outer contact part 121 and the terminal part 122 may be stably maintained.

In a structure of the electrode lead 100 as shown in FIGS. 5-8, a discharge current may move from the electrode assembly 200 to a load in the order of the tab contact part 111, the inner contact part 112, the outer contact part 121, the outer edge part 123, and the terminal part 122. A charge current may move from a charging device to the electrode assembly 200 in the order of the terminal part 122, the outer edge part 123, the outer contact part 121, the inner contact part 112, and the tab contact part 111. The inner edge part 113 may be inserted into an electrical path between the inner contact part 112 and the tab contact part 111. The outer edge part 123 may be omitted from an electrical path between the outer contact part 121 and the terminal part 122.

However, in an abnormal situation where the inner pressure of the secondary battery increases due to generation of gas or the like, the inner contact part 112 is disconnected from the outer contact part 121, and thus no more current flows to the electrode lead 100. Thus, a charging or discharging operation of the secondary battery may be stopped, and thus safety may be secured.

In this configuration, the outer contact part 121 may be configured to be at least partially bent in a direction toward the inner lead 110 to partially contact the inner contact part 112.

For example, as shown in FIGS. 7 and 8, the outer contact part 121 may be configured to be at least partially bent in a left direction. In particular, the outer contact part 121 may have a plate shape, and a center portion of the outer contact part 121 may be bent in the inward direction. At least a portion of the bent center portion may directly contact the inner contact part 112.

The outer contact part 121 may be configured such that an inner end of the bent portion is flat. For example, as shown in FIGS. 7 and 8, that a left end of the outer contact part 121 may be flat. In more detail, the left end of the outer contact part 121 may have an oval plate shape, as shown in FIG. 9. When the inner end of the outer contact part 121 is flat as described above, the inner end of the outer contact part 121 may more stably contact the inner contact part 112.

Preferably, a coupling hole that penetrates through the inner contact part 112 in an inside-outside direction may be formed in at least a portion of the inner contact part 112. For example, a hole as indicated by H1 of FIG. 6 may be formed in the inner contact part 112.

In this case, the outer contact part 121 may contact the inner contact part 112 along the edge of the coupling hole. For example, a coupling hole H1 in an oval shape may be formed in a center part of the inner contact part 112. The inner end of the outer contact part 121 may have an oval shape that is the same as or similar to the coupling hole H1. In this case, the inner end of the outer contact part 121 may have a size that is the same as or greater than that of the coupling hole H1. For example, in the configuration of FIG. 7, a vertical length of the flat inner end of the outer contact part 121 may be somewhat greater than that of the coupling hole H1 of the inner contact part 112. In this case, the inner end of the outer contact part 121 may contact the inner contact part 112 at the coupling hole of the inner contact part 112, as a portion indicated by B in FIG. 7. In this case, the outer contact part 121 may transmit or receive electrical energy to or from the inner contact part 112 via the contact portion such as the portion indicated by B.

Also preferably, the outer contact part 121 may be configured to move in the outward direction to be separated from the inner contact part 112 when the inner pressure of the pouch-type secondary battery increases. In this case, the positions of the terminal part 122 and the outer edge part 123 may be maintained without changes. This will be described in more detail with reference to FIGS. 11 and 12.

Figure 11:
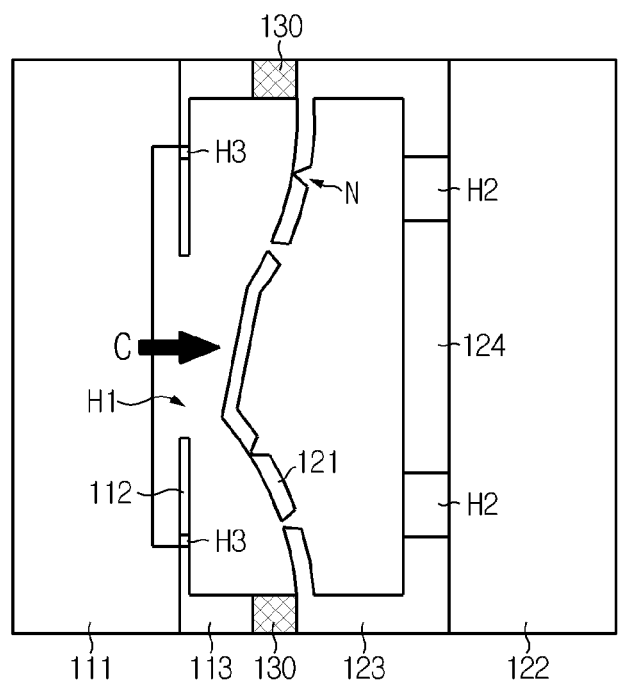
FIG. 11 is a top cross-sectional view schematically illustrating deformation of the electrode lead according to an embodiment of the present disclosure with an increase in an inner pressure of a secondary battery.
Figure 12:
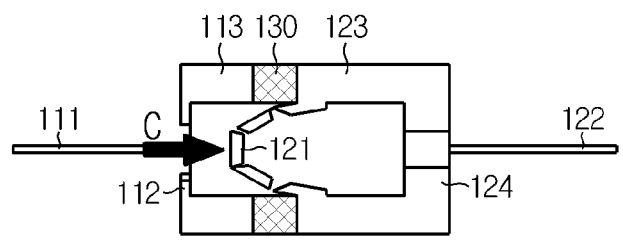
FIG. 12 is a front cross-sectional view schematically illustrating deformation of the electrode lead according to an embodiment of the present disclosure with an increase in an inner pressure of a secondary battery.

FIG. 11 is a top cross-sectional view schematically illustrating deformation of the electrode lead 100 according to an embodiment of the present disclosure with an increase in the inner pressure. FIG. 12 is a front cross-sectional view schematically illustrating deformation of the electrode lead 100 according to an embodiment of the present disclosure with an increase in the inner pressure. FIG. 11 may be deformation of the structure of FIG. 7 according to an increase in the inner pressure, and FIG. 12 may be deformation of the structure of FIG. 8 according to an increase in the inner pressure.

Referring to FIGS. 11 and 12, when gas is generated within the secondary battery and thus the inner pressure of the secondary battery increases, a pressure may be applied from a left direction, which is the inward direction, to a right direction. In this case, the contact portion of the inner lead 110 and the outer lead 120 may be detached from each other. In other words, when the inner pressure of the secondary battery increases, a force trying to move the outer contact part 121 in the outward direction may be generated. At this time, when the force trying to move the outer contact part 121 in the outward direction reaches or exceeds a certain level and thus the outer contact part 121 moves in the outward direction as indicated by an arrow C in FIGS. 11 and 12, the outer contact part 121 and the inner contact part 112 may be detached from each other. Accordingly, the electrical connection between the inner contact part 112 and the outer contact part 121 may be released, and thus no more charge or discharge current may flow between the inner lead 110 and the outer lead 120.

At this time, positions and/or shapes of the terminal part 122 and the outer edge part 123 may be maintained without changes. For example, even when the outer contact part 121 moves in the outward direction and is thus separated from the inner contact part 112 when the inner pressure of the pouch-type secondary battery increases, the positions of the terminal part 122 and the outer edge part 123 may be maintained.

The magnitude of a force capable of separating the outer contact part 121 from the inner contact part 112 may be set differently according to shapes, sizes, use purposes, performances, or the like of the secondary battery. For example, the outer contact part 121 may be configured to move in the outward direction to be separated from the inner contact part 112 when the inner pressure of the pouch-type secondary battery is equal to or greater than 1.5 atm.

In order to help a pressure to be properly applied to the outer contact part 121 when the inner pressure of the secondary battery increases, an inner space and an outer space of the outer contact part 121 may be configured to be sealed together. In other words, hollows may be formed in the inner lead 110 and the outer lead 120 and may be blocked by the outer contact part 121. For example, the inner lead 110 may have an inner hollow demarcated by the inner edge part 113, and the outer lead 120 may have an outer hollow demarcated by the outer edge part 123. The outer contact part 121 is located between the inner hollow and the outer hollow to block fluid flow between the inner hollow and the outer hollow. According to this structure, gas generated within the secondary battery is able to fully apply a force to the outer contact part 121, and thus the outer contact part 121 may easily move in the outward direction and thus may be separated from the inner contact part 112 when the inner pressure of the secondary battery increases.

Preferably, the outer lead 120 may further include an outer cover part 124, as shown in several drawings.

As shown in FIG. 7, the outer cover part 124 may be located on an outer end of the outer edge part 123 and thus may cover the outside of the outer contact part 121. In particular, when the outer lead 120 is viewed inwards from the outside of the secondary battery, as shown in FIG. 10, the outer cover part 124 may be formed such that the outer contact part 121 is not exposed to the outside. Accordingly, the outer cover part 124 may protect an outer surface of the outer contact part 121 and thus may prevent moisture, a foreign material, an impact, or the like from being delivered to the outer contact part 121.

As viewed in a horizontal direction from the outside, the outer cover part 124 may be located within an inner space of the outer edge part 123. For example, when the outer edge part 123 is formed in an oval ring shape, the outer cover part 124 may be formed in an oval plate shape, as shown in FIG. 10. Accordingly, the outer edge part 123 may be configured to surround not only an outer circumferential part of the outer contact part 121 but also an outer circumferential part of the outer cover part 124.

The outer cover part 124 may maintain the shape of the outer lead 120 and may reinforce rigidity of the outer lead 120. For example, the outer cover part 124 may have a plate shape that is thicker than the outer contact part 121, as shown in FIG. 7, and thus may support the outer edge part 123. Accordingly, the outer cover part 124 may maintain the entire shape of the outer lead 120 such that, not only while the secondary battery is being used but also when the outer contact part 121 was detached from the inner contact part 112 due to an increase in the inner pressure, the exterior shape of the outer lead 120 is not greatly changed. Accordingly, a problem, such as a short circuit or part damage due to deviation of the outer lead 120, may be prevented.

The outer cover part 124 may be disposed a predetermined distance apart from the outer contact part 121. For example, in the structure of FIG. 7, the outer cover part 124 may be disposed to be a predetermined distance apart from the outer contact part 121 in the right direction. Accordingly, an empty space may be formed between the outer cover part 124 and the outer contact part 121. This empty space ensures outward movement of the outer contact part 121, and thus, when the inner pressure of the secondary battery increases, the outer contact part 121 may be separated from the inner contact part 112.

An outer through hole may be formed in the outer cover part 124. For example, as indicated by H2 of FIGS. 7 and 10, outer through holes each penetrating through the outer cover part 124 in the inside-outside direction may be formed in the outer cover part 124. In this case, gas outside the secondary battery may flow into the hollow of the outer lead 120 via the outer through holes H2. Accordingly, the hollow of the outer lead 120, namely, a right portion of the outer contact part 121 in FIG. 7, may be kept in an atmospheric pressure state.

According to this structure of the present disclosure, when the inner pressure of the secondary battery increases, the outer contact part 121 may be moderately separated from the inner contact part 112. For example, when an outer portion of the outer contact part 121 receives an excessively high pressure, even when gas is generated within the secondary battery and thus the pressure of an inner portion of the outer contact part 121 increases, the outer contact part 121 may not properly move in the outward direction. On the other hand, when the outer portion of the outer contact part 121 receives an excessively low pressure, even when no gas is generated within the secondary battery, the outer contact part 121 may move in the outward direction, and thus use of the secondary battery may be difficult. However, if the outer portion of the outer contact part 121 is kept in an atmospheric pressure state via the outer through holes H2 as in the above embodiment, when a pressure difference between the inside and the outside of the outer contact part 121 reaches or exceeds a certain level due to generation of gas within the secondary battery, the outer contact part 121 may move in the outward direction and thus may be separated from the inner contact part 112. In other words, in the above embodiment, a configuration that enables the outer contact part 121 to be separated from the inner contact part 112 at a moderate inner pressure level may be easily designed.

In addition, according to an embodiment of the present disclosure, an inner through hole may be formed in the inner contact part 112. For example, as indicated by H3 of FIGS. 7 and 9, inner through holes each penetrating through the inner contact part 112 in a horizontal direction, namely, the inside-outside direction, may be formed in the inner contact part 112.

According to this embodiment of the present disclosure, gas within an inner space of the inner contact part 112 may flow into an outer space of the inner contact part 112 via the inner through holes H3. Moreover, the inner contact part 112 may be located on an inner end of the inner edge part 113 as shown in FIG. 7, and gas within the secondary battery may be introduced into the hollow of the inner lead 110 via the inner through holes H3. The gas introduced into the hollow of the inner lead 110 may press the outer contact part 121 in the outward direction. In particular, the outer contact part 121 may be located on an inner end of the outer edge part 123 such that a center part of the outer contact part 121 protrudes in the inward direction. The gas introduced into the hollow of the inner lead 110 via the inner through holes H3 may press a lateral surface of the protruding part of the outer edge part 123 in the outward direction. This lateral surface pressing may help the outer contact part 121 to be smoothly separated from the inner contact part 112.

According to an embodiment of the present disclosure, at least one notch may be formed on the outside of a portion of the outer contact part 121 that contacts the inner contact part 112. For example, in the structure of FIG. 7, at least one notch may be formed may be formed on the outer contact part 121, as indicated by N.

According to this structure of the present disclosure, when the inner pressure of the secondary battery increases, the outer contact part 121 may more easily move in the outward direction due to the notches N. Accordingly, when gas is generated within the secondary battery, the outer contact part 121 may be more easily separated from the inner contact part 112.

In addition, according to this configuration of the present disclosure, when the outer contact part 121 moves in the outward direction, portions of the notches N may fracture. Accordingly, the gas generated within the secondary battery may be discharged via the fractured portions of the notches N. Moreover, when the outer cover part 124 includes the outer through holes H2 as described above, the gas discharged via the fractured portions of the notches N may be discharged to the outside of the secondary battery via the outer through holes H2.

According to this structure of the present disclosure, when the inner pressure of the secondary battery increases, movement or deformation of the secondary battery may be induced due to the notches N. In other words, when a pressure difference between the inside and the outside of the secondary battery occurs, a notch-formed portion of the outer contact part 121 is prone to be first deformed, and thus a location or form of deformation of the secondary battery may be predicted or determined. Accordingly, a configuration for separating the inner contact part 112 from the outer contact part 121 may be easily obtained, and a gas discharge path via the fractured portions of the notches may also be easily designed.

The notches N may be formed on an outer surface of the outer contact part 121. For example, in the structure of FIGS. 7 and 8, the notches N may be formed on a right surface of the outer contact part 121. When the inner pressure of the secondary battery increases, the notches N move in the outward direction. Thus, according to this configuration of the present disclosure, the outer contact part 121 may more easily move in the outward direction. In addition, according to this configuration of the present disclosure, when the outer contact part 121 moves, portions of the notches N may more easily fracture, and thus gas may be more smoothly discharged.

The notches N may be formed to be located outside of the portions of the outer contact part 121 that contact and are fixed to the inner contact part 112. For example, in the embodiment of FIG. 7, the notches N may be formed on a level that is higher or lower than the portions B of the outer contact part 121 that contact the inner contact part 112. In other words, as in the embodiment of FIG. 9, when the center part of the outer contact part 121 has an oval shape and thus a circumferential portion of the oval contacts the inner contact part 112 and is fixed thereto, notches may be formed on the outside of the oval center part of the outer contact part 121.

According to this structure of the present disclosure, when the inner pressure of the secondary battery increases, the contacting and fixing portions B of the outer contact part 121 and the inner contact part 112 may be stably separated. In other words, when a pressure is applied between two portions B, namely, to the inner end of the outer contact part 121, in the embodiment of FIG. 7, the inner end of the outer contact part 121 may move in a flat state in the outward direction without being easily deformed, and notches located on the outside of the inner end may be deformed, as shown in FIG. 11. Accordingly, the outer contact part 121 may be more stably separated from the inner contact part 112.

The electrode lead 100 according to an aspect of the present disclosure may further include an insulating member 130, as shown in several drawings.

The insulating member 130 may be formed of an electrically-insulating material and may be interposed between the inner lead 110 and the outer lead 120 to electrically insulate the inner lead 110 from the outer lead 120 except for specific portions thereof. In particular, the insulating member 130 may have a ring shape and may be disposed between an edge of the inner lead 110 and an edge of the outer lead 120. Accordingly, the insulating member 130 may electrically insulate the edge of the inner lead 110 from the edge of the outer lead 120.

In more detail, the insulating member 130 may be horizontally interposed between the inner edge part 113 and the outer edge part 123. In this case, the insulating member 130 may have a similar shape to the inner edge part 113 and the outer edge part 123. For example, when the inner edge part 113 and the outer edge part 123 have oval shapes, the insulating member 130 may have a shape of an oval having the same long radius and the same short radius as those of the inner edge part 113 and the outer edge part 123. In this case, because the insulating member 130 neither protrudes from the electrode lead 100 nor is sunken therefrom, the insulating member 130 may prevent sealing between the electrode lead 100 and the pouch casing 300 from being weaken.

According to an embodiment including the insulating member 130 as described above, a configuration for insulating the inner lead 110 from the outer lead 120 except for specific portions thereof may be easily obtained. In particular, when the inner pressure of the secondary battery increases, a configuration for separating the inner lead 110 from the outer lead 120 may be more easily obtained. For example, in a normal case, the electrical connection between the inner lead 110 and the outer lead 120 may be maintained via contact between the inner contact part 112 and the outer contact part 121. However, in the case where the insulating member 130 is included, the inner lead 110 may be insulated from the outer lead 120 except for contacting portions between the inner contact part 112 and the outer contact part 121.

Thus, in an abnormal situation where the inner pressure of the secondary battery increases, if the inner contact part 112 and the outer contact part 121 are separated from each other, the electrical connection between the inner lead 110 and the outer lead 120 may be released. In this case, only the shape of the outer contact part 121 is changed, and the inner lead 110 and the outer lead 120 maintain their original locations and the inner lead 110 may be insulated from the outer lead 120. Accordingly, the outer lead 120 does not need to be entirely deviated from the inner lead 110 in order to separate the inner contact part 112 from the outer contact part 121, and a problem, such as destruction or a electrical short circuit of other components outside the secondary battery due to deviation of the outer lead 120, may not occur.

When the insulating member 130 is included between the inner lead 110 and the outer lead 120 as described above, the inner lead 110 and the outer lead 120 may be more easily manufactured. For example, because the inner edge part 113 and the outer edge part 123 may be insulated from each other by the insulating member 130, the inner edge part 113 and the outer edge part 123 may be formed of an electrically-conductive material, such as metal. In particular, in this case, because the inner lead 110 and the outer lead 120 may be entirely formed of the same metal material, the inner lead 110 and the outer lead 120 may be more simply manufactured, and rigidity that is equal to or greater than a certain level may be secured.

In the electrode lead 100 according to an embodiment of the present disclosure, respective portions of the inner lead 110 and the outer lead 120 that contact each other may be welded. For example, in the embodiment of FIG. 7, the inner contact part 112 and the outer contact part 121 may be welded and fixed at the portions B.

According to such an embodiment of the present disclosure, a contact structure between the inner lead 110 and the outer lead 120 is stably maintained, and thus, in a normal situation, an electrical short circuit of the electrode lead 100 may be prevented. For example, according to the above embodiment, only when the inner pressure of the secondary battery reaches or exceeds a certain level, the inner lead 110 and the outer lead 120 may be separated from each other. When no gas is generated within the secondary battery or a slight impact is applied to the secondary battery, the inner lead 110 may not be separated from the outer lead 120. Thus, according to this embodiment of the present disclosure, unintentional suspension of a function of the secondary battery may be prevented.

The electrode lead 100 according to an embodiment of the present disclosure may further include sealing films.

Figure 13:
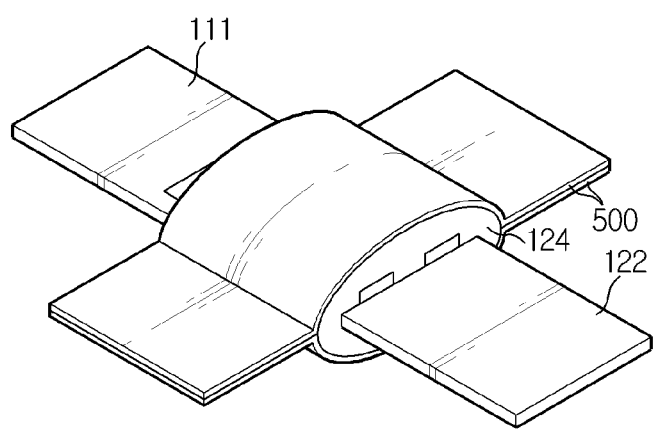
FIG. 13 is a perspective view of an electrode lead according to another embodiment of the present disclosure.

FIG. 13 is a schematic perspective view of a configuration of the electrode lead 100 according to an embodiment of the present disclosure.

Referring to FIG. 13, the sealing films 500 may be included on upper portions and lower portions of the inner lead 110 and the outer lead 120. In particular, the sealing films 500 may be attached to an outer surface of the inner edge part 113 of the inner lead 110 and an outer surface of the outer edge part 123 of the outer lead 120. Two sealing films 500 may be included, one of which may be included on an upper portion of the electrode lead 100 and the other of which may be included on a lower portion of the electrode lead 100.

According to this embodiment of the present disclosure, when the electrode lead 100 is assembled into the secondary battery, the inner lead 110 and the outer lead 120 may be firmly attached to an inner surface of the pouch casing 300 such that no cracks occur between the electrode lead 100 and the pouch casing 300. In particular, the inner edge part 113 and the outer edge part 123 in the electrode lead 100 may directly contact the pouch casing 300, and may be formed of a metal material. However, because the internal adhesion layer of the pouch casing 300 may be formed of a polymer, the inner edge part 113 and the outer edge part 123 may not be properly attached to the pouch casing 300. However, as in the above embodiment, according to a structure in which the sealing films 500 are attached to surfaces of the inner edge part 113 and the outer edge part 123, sealing between the electrode lead 100 and the pouch casing 300 may be stably maintained.

A secondary battery according to the present disclosure may include at least one electrode lead 100 according to the present disclosure described above. In other words, the secondary battery according to the present disclosure may include the above-described electrode lead 100 as a positive electrode lead and/or a negative electrode lead.

A battery pack according to the present disclosure may include the secondary battery according to the present disclosure. In other words, the battery pack according to the present disclosure may include a secondary battery including the above-described electrode lead 100 according to the present disclosure. At least one secondary battery as described above may be included. Moreover, the battery pack according to the present disclosure may further include a cartridge used to stack secondary batteries, a pack case for accommodating the secondary batteries and the cartridge, an electronic unit (e.g., a relay) for controlling and protecting a charging or discharging operation of the secondary batteries, such as a bus bar for electrically connecting the secondary batteries to each other, a Battery Management System (BMS), a fuse, or a relay, and/or a duct for flowing cooling fluid into or out of the battery pack.

A secondary battery including the electrode lead 100 according to the present disclosure is applicable to vehicles, such as electric vehicles or hybrid vehicles. In other words, a vehicle according to the present disclosure may include the battery pack according to the present disclosure.

The secondary battery including the electrode lead 100 according to the present disclosure is also applicable to power storage devices. In other words, a power storage device according to the present disclosure may include the battery pack according to the present disclosure. Such a power storage device is applicable to various fields and places for power storage, such as a smart grid system for power supply and demand control or a charging station of electric vehicles.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. An electrode lead of a pouch-type secondary battery in which outer circumferential parts of a pouch casing are sealed and an electrode assembly is accommodated in a center part of the pouch casing, the electrode lead comprising:
   an inner lead at least partially formed of an electrically-conductive material, the inner lead being configured to contact an electrode tab of the electrode assembly, and to be interposed between sealing parts of the pouch casing; and
   an outer lead disposed to extend outside of the inner lead, at least partially formed of an electrically-conductive material, providing an external terminal connectable to an external device, interposable between the sealing parts of the pouch casing, and configured such that a portion of the outer lead is received in and contacts the inner lead and that, when an inner pressure of the pouch-type secondary battery increases, the outer lead is partially deformed and thus the portion of the outer lead is detached from the inner lead,
   wherein the electrode lead has an overall length that is greater than an overall width of the electrode lead and an overall thickness of the electrode lead, such that the overall length defines a longitudinal axis,
   wherein the portion of the outer lead is inserted into the inner lead along the longitudinal axis to be received in the inner lead, and
   wherein the outer lead is configured to be displaceable linearly relative to the inner lead.

2. The electrode lead of claim 1, further comprising an insulating member formed of an electrically-insulating material, having a ring shape, and interposed between an edge of the inner lead and an edge of the outer lead to electrically insulate the edge of the inner lead from the edge of the outer lead.

3. The electrode lead of claim 1, wherein respective portions of the inner lead and the outer lead that contact each other are welded together.

4. The electrode lead of claim 1, further comprising a sealing film interposed between the inner lead and the outer lead, the sealing film being interposable between the sealing parts of the pouch casing to attach the inner lead and the outer lead to the sealing parts of the pouch casing.

5. The electrode lead of claim 1, wherein the portion of the electrode lead received inside the inner lead is displaceable along the longitudinal axis of the electrode lead when the outer lead is partially deformed.

6. The electrode lead of claim 1, wherein the inner lead comprises a tab contact part formed of an electrically-conductive material and configured to contact the electrode tab of the electrode assembly, an inner contact part formed of an electrically-conductive material, having a plate shape, located outside the tab contact part and electrically connectable to the tab contact part, and an inner edge part located along an edge of the inner contact part and interposable between the sealing parts of the pouch casing.

7. The electrode lead of claim 6, wherein the outer lead comprises an outer contact part formed of an electrically-conductive material, having a plate shape, at least partially contacting the inner contact part, and configured to be separable from the inner contact part when the inner pressure of the pouch-type secondary battery increases, a terminal part electrically connected to the outer contact part and exposable to an outside of the pouch casing such that an external device is connectable to the terminal part, and an outer edge part located along an edge of the outer contact part and disposable in the sealing parts of the pouch casing to fixedly contact the sealing parts.

8. The electrode lead of claim 7, wherein, when the inner pressure of the pouch-type secondary battery increases, positions of the terminal part and the outer edge part are fixed, and the outer contact part moves to an outward direction and is detached from the inner contact part.

9. The electrode lead of claim 7, wherein the inner edge part and the outer edge part are in an oval ring shape.

10. The electrode lead of claim 7, wherein the inner contact part has an inner through hole formed in an outside of a portion of the inner contact part that contacts the outer contact part, and the inner through hole penetrates through the inner contact part in an inside-outside direction.

11. The electrode lead of claim 7, wherein the outer contact part has at least one notch formed in an outside of a portion of the outer contact part that contacts the inner contact part.

12. The electrode lead of claim 7, wherein the outer lead further comprises an outer cover part located on an outer end of the outer edge part to cover an outside of the outer contact part and disposed a predetermined distance apart from the outer contact part to form an empty space between the outer cover part and the outer contact part.

13. The electrode lead of claim 12, wherein the outer cover part has an outer through hole that penetrates through the outer cover part in an inside-outside direction.

14. The electrode lead of claim 7, wherein the outer contact part is at least partially bent in an inward direction to partially contact the inner contact part.

15. The electrode lead of claim 14, wherein an inner end of the bent portion of the outer contact part is flat.

16. The electrode lead of claim 15, wherein
the inner contact part has a coupling hole that penetrates through the inner contact part in an inside-outside direction, and
the outer contact part contacts the inner contact part along an outer circumference of the coupling hole.

17. A pouch-type secondary battery comprising the electrode lead according to claim 1.

18. A battery pack comprising the pouch-type secondary battery according to claim 17.

19. A vehicle comprising the battery pack according to claim 18.

20. An electrode lead of a pouch-type secondary battery in which outer circumferential parts of a pouch casing are sealed and an electrode assembly is accommodated in a center part of the pouch casing, the electrode lead comprising:
an inner lead at least partially formed of an electrically-conductive material, the inner lead being configured to be interposed between sealing parts of the pouch casing, the inner lead including a tab contact part formed of an electrically-conductive material and configured to contact the electrode tab of the electrode assembly and an inner contact part formed of an electrically-conductive material, having a plate shape, located outside the tab contact part, the inner contact part having a coupling hole that penetrates through the inner contact part in an inside-outside direction; and
an outer lead disposed to extend outside of the inner lead, at least partially formed of an electrically-conductive material, providing an external terminal connectable to an external device, interposable between the sealing parts of the pouch casing, the outer lead having an outer contact part formed of an electrically-conductive material, having a plate shape, at least partially contacting the inner contact part, the outer contact part being configured to be separable from the inner contact part such that, when the inner pressure of the pouch-type secondary battery increases, the outer lead is partially deformed and thus the portion of the outer lead is detached from the inner lead, and the outer contact part contacts the inner contact part along an outer circumference of the coupling hole.

* * * * *